June 22, 1943.  W. O. MITSCHERLING  2,322,699
LIGHT REFLECTING DEVICE
Filed Sept. 9, 1941

INVENTOR.
WALDEMAR O. MITSCHERLING.
BY

Patented June 22, 1943

2,322,699

UNITED STATES PATENT OFFICE 2,322,699

LIGHT REFLECTING DEVICE

Waldemar O. Mitscherling, New York, N. Y., assignor to Reflecto Letters, Inc., New York, N. Y., a corporation of New York Application September 9, 1941, Serial No. 410,210

3 Claims. (Cl. 88—82)

The present invention is directed to light reflecting devices, more particularly to the type wherein the reflectors are adapted to refract and reflect light falling thereon back towards the source of light.

The present invention has among its objects to provide a reflector which will overcome the disadvantages and difficulties encountered in prior art devices, and to provide a reflector which shall be highly efficient in the reflecting of light back to the source, and which shall be capable of ready mounting in a simple and permanent manner.

In carrying the objects of the present invention into effect, I provide a reflector based upon a conception that the provision of facets rather than a lens will render the reflector more effective. More specifically, there is provided a transparent member having a lens in the front thereof to receive light. At the rear is the reflector having a plurality of facets, usually arranged in a symmetrical pattern and comprising flat surfaces at an angle to each other. Joining the lens and reflector is a substantially cylindrical portion adapted to guide the light passing between lens and reflector. The junction between the cylinder and reflector being approximately a right angle renders it a simple matter to provide a mounting for said device which will hold the same securely in position. Ordinarily, the various refracting and reflecting surfaces are based upon a single sphere, although the lens may be based upon a sphere of one diameter and the reflector upon a sphere of a greater diameter, so that the center of the latter is on the centerline or axis of the cylinder below the center of said lens.

In the accompanying drawing constituting a part hereof and in which like reference characters indicate like parts:

Figure 1:
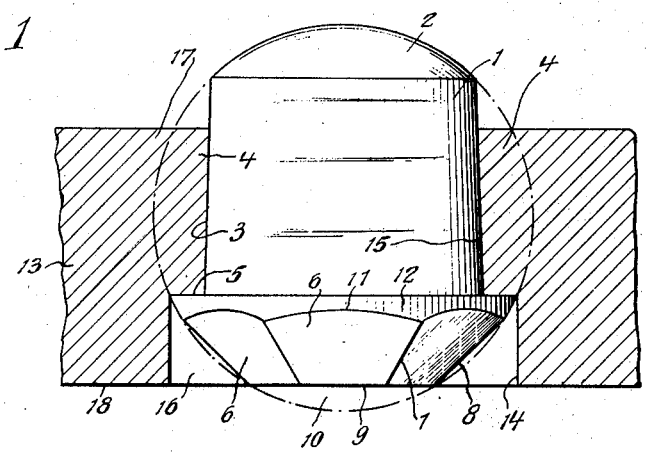
Fig. 1 is a side elevational view of the subject matter of the present invention, some of the parts being shown broken away and in cross-section for clearness.
Figure 2:
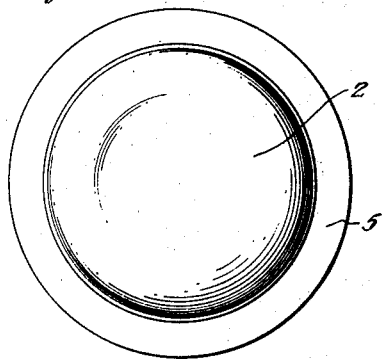
Fig. 2 is a top plan view of the reflector device disassociated from other structural elements.
Figure 3:
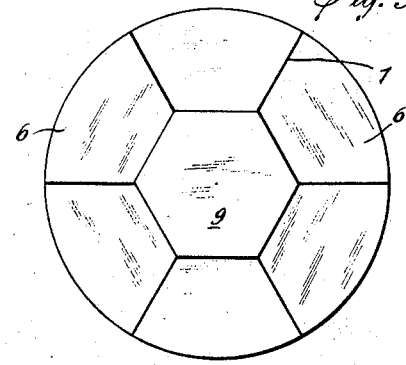
Fig. 3 is a view from below showing the opposite side of said device.

In the form of the invention shown in Figs. 1, 2 and 3, there is provided specifically a transparent reflector device, usually of glass, but which may be made of synthetic plastics, the form thereof being based upon that of a sphere 1, shown in full and broken lines. The upper convex portion 2 of the sphere constitutes a refracting lens.

The longitudinal sides 3 thereof are substantially cylindrical in cross-section and may be somewhat tapered outwardly from the lens 2. The sides 3 extend for the major portion of the depth of the entire sphere. Usually, the cylindrical portion is at least one-half of the total depth and may be two-thirds thereof. The cylindrical portion is formed by the removal of material from the circumferential area 4 of the sphere 1. This forms a substantially horizontal shoulder 5 which may be considered the junction between the upper refracting portion and the lower reflecting portion.

The latter consists essentially of a series of facets 6 around the circumference of the lower portion of the sphere 1. The facets are contiguous, meeting along substantially straight converging lines 7. They are formed by cutting segments 8 from the sphere 1. The bottom 9 of the reflector device is shown flat and in a plane substantially at right angles to the centerline of the cylindrical portion 3. It is formed by the removal of the segment 10 from sphere 1.

Various forms of mounting may be provided, and in one form there is the member 13 having a cylindrical cut-out portion 14 at the lower side thereof. A slightly inwardly and upwardly tapering, cylindrical portion 15 of smaller diameter than opening 14 is provided at the upper end, and a shoulder joins portions 14 and 15. The sphere 1 is inserted into the shoulder opening of member 13, and by reason of the upwardly tapering portion 15 may be held in place by friction. If desired, filling material may be introduced therein at area 16 to more securely hold the sphere 1 in place. The upper surface 17 of member 13 is below the junction of lens 2 and sides 3. Usually, the bottom face 9 is contained within the bottom face 18 of the holding member 13 and may be entirely covered by the filling material.

The outer surfaces of the portions below shoulder 5 are silvered or otherwise coated to enhance the reflecting power thereof.

The construction is such that the mounting may be a base having a shouldered cylindrical opening into which the reflector is inserted. It may be held in place merely by friction or a flat member may be used to cover the back. Light entering lens 2 over a wide angle is refracted down into the body of the reflector, partly directly onto the facets and partly along the walls of cylinder 3. This enables the reflector to gather light from a relatively wide outside source and return the same to the lens to give a high degree of visibility.

Although I have described my invention setting forth several specific embodiments thereof, my invention is not limited thereto and such embodiments are to be considered as illustrations of the many forms capable of being embraced in the present invention. For instance, instead of the facets shown, other forms and different numbers thereof may be provided. The shoulder constituting the junction between cylinder and reflector may be wider or narrower than shown, and it need not be exactly a right angle. Ordinarily, in a commercial form of the invention the cylinder s about one-half of the total height, the lens about one-fourth and the portions below the shoulder also one-fourth. However, various other relative dimensions may be used successfully.

These and other changes may be made in the details of the invention within the spirit thereof, and the invention is to be broadly construed and not to be limited except by the claims appended hereto.

What I claim is:

1. A transparent reflector for signs comprising a front refracting convex lens having a circular edge, said lens being a portion of a sphere, a substantially cylindrical body portion extending rearwardly from said lens, the center of said sphere being within said body, a convex rear reflecting surface, a transverse shoulder at the area of junction of said body and rear surface, the outer edge of said shoulder being a circle having the same radius and the same center as said sphere, facets on said rear surface, the corners of said facets being on radii of said sphere, and a polygonal facet at the rear of said surface in a plane transverse to said body and having its corners on radii of said sphere.

2. A transparent reflector for signs comprising a front refracting convex lens having a circular edge, said lens being a portion of a sphere, a substantially cylindrical body portion extending rearwardly from said lens, the center of said sphere being within said body, a convex rear reflecting surface, a transverse shoulder at the area of junction of said body and rear surface, the outer edge of said shoulder being a circle having the same radius and the same center as said sphere, the depth of said body being at least equal to that of said lens and surface combined, facets on said rear surface, the corners of said facets being on radii of said sphere, and a polygonal facet at the rear of said surface in a plane transverse to said body and having its corners on radii of said sphere.

3. A transparent reflector for signs comprising a front refracting convex lens having a circular edge, said lens being a portion of a sphere, a substantially cylindrical body portion extending rearwardly from said lens, the center of said sphere being within said body, a convex rear reflecting surface, a transverse shoulder at the area of junction of said body and rear surface, the outer edge of said shoulder being a circle having the same radius and the same center as said sphere, facets on said rear surface, the area of said surface adjacent said shoulder being free from facets and being a portion of said sphere, the corners of said facets being on radii of said sphere, and a polygonal facet at the rear of said surface in a plane transverse to said body and having its corners on radii of said sphere.

WALDEMAR O. MITSCHERLING.